(12) United States Patent
Nishikawa (10) Patent No.: US 7,978,385 B2
(45) Date of Patent: Jul. 12, 2011

(54) INFORMATION PROCESSING METHOD, INFORMATION PROCESSING APPARATUS, PROGRAM AND MEDIUM

(75) Inventor: Hiromitsu Nishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 904 days.

(21) Appl. No.: 11/619,270

(22) Filed: Jan. 3, 2007

(65) Prior Publication Data

US 2007/0159645 A1 Jul. 12, 2007

(30) Foreign Application Priority Data

Jan. 6, 2006 (JP) ................................ 2006-001517

(51) Int. Cl.
*H04N 1/46* (2006.01)
*G03F 3/08* (2006.01)
*G06K 9/00* (2006.01)

(52) U.S. Cl. ...................... 358/523; 358/515; 358/518

(58) Field of Classification Search ............... 358/1.9, 358/3.24, 500, 504, 518, 520, 523, 515; 382/167; 345/600, 604, 605
See application file for complete search history.

(56) References Cited

U.S. PATENT DOCUMENTS

| | | | |
|---|---|---|---|
| 4,929,978 A | 5/1990 | Kanamori et al. | |
| 5,243,414 A | 9/1993 | Dalrymple et al. | |
| 5,579,031 A * | 11/1996 | Liang | 345/604 |
| 6,923,523 B2 | 8/2005 | Nishikawa | 347/43 |
| 6,952,493 B2 * | 10/2005 | Zeng | 382/162 |
| 2003/0133138 A1* | 7/2003 | Namikata | 358/1.9 |
| 2004/0070777 A1 | 4/2004 | Nishikawa | 358/1.9 |
| 2005/0052670 A1 | 3/2005 | Nishikawa | 358/1.9 |
| 2005/0052671 A1 | 3/2005 | Nishikawa | 358/1.9 |
| 2006/0115147 A1 | 6/2006 | Nishikawa | 358/164 |
| 2007/0146753 A1 | 6/2007 | Nishikawa | 358/1.9 |

FOREIGN PATENT DOCUMENTS

| | | |
|---|---|---|
| EP | 0 273 398 A2 | 6/1988 |
| EP | 0 441 305 A2 | 8/1991 |
| EP | 0 624 850 A2 | 11/1994 |
| EP | 0 750 419 A2 | 12/1996 |
| EP | 0 901 278 A1 | 3/1999 |
| JP | A11-025274 | 1/1999 |

* cited by examiner

*Primary Examiner* — James A Thompson
(74) *Attorney, Agent, or Firm* — Fitzpatrick, Cella, Harper & Scinto (57) ABSTRACT

A patch image generating section 101 generates a patch image by resolving the RGB space into an arbitrary number of steps, and by converting into a CMYK space via an LUT. A patch image calorimetric section 102 outputs the patch image onto a recording medium via a printer, and carries out colorimetry of the output image with a calorimeter. As calorimetric values, calorimetric values represented in an L*a*b* space independent of the RGB space and CMYK space are obtained. A linear space generating section 104 calculates ideal spatial distribution in the color space of the LUT according to the calorimetric values supplied. A color separation evaluation value calculating section 105 compares the ideal spatial distribution in the color space of the LUT with actual measurement data of the LUT. According to the compared results, color separation evaluation values are calculated from differences between the ideal value and actual measurement values.

11 Claims, 10 Drawing Sheets

INFORMATION PROCESSING METHOD, INFORMATION PROCESSING APPARATUS, PROGRAM AND MEDIUM

BACKGROUND OF THE INVENTION

1. Field of the Invention

The present invention relates to an information processing method, information processing apparatus, program and medium of an image forming apparatus such as a color printer.

2. Description of Related Art

An image quality evaluation method of output images of image forming apparatuses such as printers are divided into a psychological evaluation that evaluates the degree perceived by vision, and a physical evaluation that evaluates by objectively measuring values of properties of image structures. As one of the important factors of the image quality, there is gradation of an image.

As a standard for representing the gradation physically, a method of obtaining a "distinguished gray scale" is used which divides the density range of a patch image, in which a pixel value has a fixed area separated apart at fixed intervals, by twice the RMS granularity (it will be called conventional technique 1). Although the algorithm of the conventional technique 1 can calculate the distinguished gray scale of a printer, it cannot evaluate an image such as a gradation image whose color or lightness continuously changes from shadow to highlight. Even if the interval is made small of the input pixel values of the patches used for calculating the distinguished gray scale, accurate gradation evaluation cannot be achieved because of the following reasons. First, colors and lightness can change in accordance with printing positions because of the effect of noise superposed onto the printing regions when the printer carries out printing or of the shading characteristics of the printer. Second, using a patch image as the evaluation image presents a problem in that since the impression, which is given by an image such as a gradation image whose colors and lightness gradually vary in very small regions, differs from the impression perceived by human vision, matching is not good between the evaluation values.

To solve the problem, a method is proposed which carries out the so-called objective evaluation of a gradation image output from an image forming apparatus. For example, Japanese patent application laid-open No. 11-25274/1999 discloses an image evaluation method of such a kind (called conventional technique 2 from now on). The method, using at least one of the optical information items including the lightness information and density information on the image output, calculates the difference between the optical information items on adjacent gray levels, thereby objectively evaluating gradation characteristics of the output apparatus.

However, according to the conventional technique 1 or the conventional technique 2 which is the improved method of the former and is disclosed in the foregoing document, the gradation evaluation is not performed for all the gradations distributed three-dimensionally, but is carried out only along one axis of the lightness or density. In addition, even if the evaluation values can be calculated, their feedback cannot be performed directly.

SUMMARY OF THE INVENTION

Therefore an object of the present invention to provide an information processing method, information processing apparatus, program and medium capable of solving the foregoing problems.

According to a first aspect of the present invention, there is provided an information processing apparatus for a data converting section for converting data of a first color space to data of a second color space, said information processing apparatus comprising: patch image generating section for resolving the first color space into a plurality of steps, and for generating, by using said data converting section, patch image data composed of color data in the second color space corresponding to color data of the individual steps after resolving; output section for outputting onto a recording medium a patch image corresponding to the patch image data generated; calorimetric section for carrying out colorimetry of the patch image output onto the recording medium by said output section, and for outputting measured data in a third color space independent of the first color space and the second color space; evaluation reference space generating section for extracting reference point data from the measured data output, and for calculating, by using the reference point data, coordinate data of spatial distribution points corresponding to an evaluation reference in the third color space corresponding to a remainder of the measured data; and color separation evaluation value calculating section for calculating color separation evaluation values from differences between the measured data and the coordinate data of the spatial distribution points corresponding to the evaluation reference in the third color space calculated, the coordinate data corresponding to the color data of the individual steps.

According to a second aspect of the present invention, there is provided an information processing method for a data converting section for converting data of a first color space to data of a second color space, said information processing method comprising: a patch image generating step of resolving the first color space into a plurality of steps, and of generating, by using said data converting section, patch image data composed of color data in the second color space corresponding to color data of the individual steps after resolving; an output step of outputting, by output section, onto a recording medium a patch image corresponding to the patch image data generated; a calorimetric step of carrying out colorimetry of the patch image output onto the recording medium by said output section, and of outputting measured data in a third color space independent of the first color space and the second color space; an evaluation reference space generating step of extracting reference point data from the measured data output, and of calculating, by using the reference point data, coordinate data of spatial distribution points corresponding to an evaluation reference in the third color space corresponding to a remainder of the measured data; and a color separation evaluation value calculating step of calculating color separation evaluation values from differences between the measured data and the coordinate data of the spatial distribution points corresponding to the evaluation reference in the third color space calculated, the coordinate data corresponding to the color data of the individual steps after the resolving.

According to a third aspect of the present invention, there is provided an information processing method for calculating an evaluation value of a data converting section for converting data of a first color space to data of a second color space, said information processing method comprising: an input step of resolving the first color space into a plurality of steps, of generating, by using said data converting section, patch image data composed of color data in the second color space corresponding to color data of the individual steps after resolving, and of inputting measured data in a third color space, the measured data obtained by carrying out colorimetry of a generated patch image; an evaluation reference space generating step of extracting reference point data from the measured data, and for calculating, by using the reference point data, coordinate data of spatial distribution points corresponding to an evaluation reference in the third color space corresponding to a remainder of the measured data; and an evaluation value calculating step of calculating the evaluation value of said data converting section from differences between the measured data and the coordinate data of the spatial distribution points corresponding to the evaluation reference in the third color space calculated, the coordinate data corresponding to the color data of the individual steps.

According to the present invention, the gradation evaluation can be performed on all the dimensions of a color space the data converting section has. In addition, the evaluation result of the data converting section can be fed back directly in the form of modification of the data converting section.

Additional objects of the present invention will become apparent from the following detail description of the preferred embodiments with reference to the accompanying drawings.

Further features of the present invention will become apparent from the following description of exemplary embodiments (with reference to the attached drawings).

DESCRIPTION OF THE EMBODIMENTS

The invention will now be described with reference to the accompanying drawings.

First Embodiment

Figure 1:
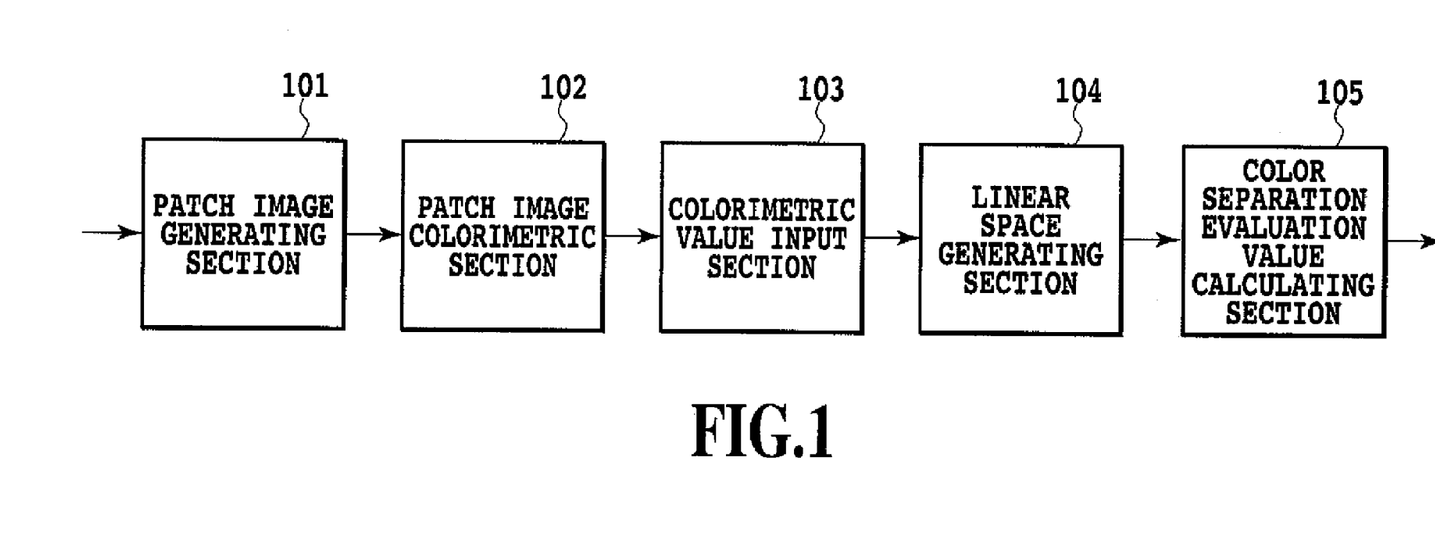
FIG. 1 is a block diagram showing an entire configuration of a color separation evaluation system of a color printer of a first embodiment in accordance with the present invention.

FIG. 1 is a block diagram showing an entire configuration of a color separation evaluation system of a color printer of a first embodiment in accordance with the present invention.

As shown in FIG. 1, the color separation evaluation system of the color printer of the present embodiment comprises a patch image generating section 101, patch image calorimetric section 102, calorimetric value input section 103, linear space generating section 104, and color separation evaluation value calculating section 105.

An LUT (lookup table) as a data converting section converts first color space data into second color space data. The patch image generating section 101 resolves the first color space into an arbitrary number of steps, converts them into the second color space via the LUT, and generates the patch image. The LUT can be composed of a memory. The LUT stores the data (values) for conversion in appropriate addresses of the memory in such a manner that the address bus of the memory corresponds to the input value and the data bus of the memory corresponds to the output value after the conversion, for example. Thus, the data input to the address causes a desired data conversion result to be output from the data bus.

The patch image generated by the patch image generating section 101 is output onto a recording medium such as paper by a printer as an output section. The patch image calorimetric section 102 has a calorimeter such as a spectrophotometer. The patch image colorimetric section 102 carries out colorimetry of the output image on the recording medium with the calorimeter. The calorimetric values obtained by the calorimeter can be expressed by a third color space independent of the first color space or second color space. The calorimetric value input section 103 is supplied with the calorimetric values obtained by the patch image colorimetric section 102. The linear space generating section 104 calculates ideal spatial distribution in the color space of the LUT from the calorimetric values supplied. The color separation evaluation value calculating section 105 compares the ideal spatial distribution in the color space of the LUT calculated by the linear space generating section 104 with the actual measurement data of the LUT supplied from the calorimetric value input section 103, thereby calculating color separation evaluation values corresponding to the differences between the ideal values and actual measurement values according to the compared results. The color space of the LUT includes the first color space and second color space.

Figure 2:
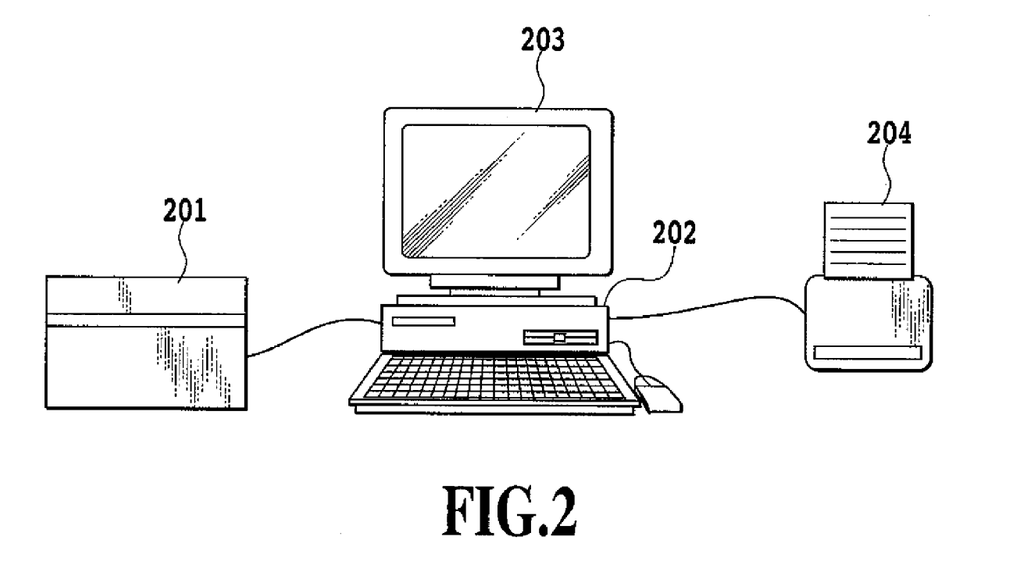
FIG. 2 is a view showing an example of a color separation evaluation system in individual embodiments in accordance with the present invention.

FIG. 2 shows a color separation image processing system as an example of the embodiment in accordance with the present invention. In FIG. 2, the reference numeral 201 designates a spectrophotometer as a patch image calorimetric section 102. The reference numeral 202 designates a computer system composed of a personal computer, for example. The computer system 202 can acquire an image signal (calorimetric data) read by the spectrophotometer 201, carry out processing that will be described later, and store the processing results in a storing section. In addition, the computer system 202 can display image signal information obtained here on a display 203, or output it via a printer 204.

Figure 3:
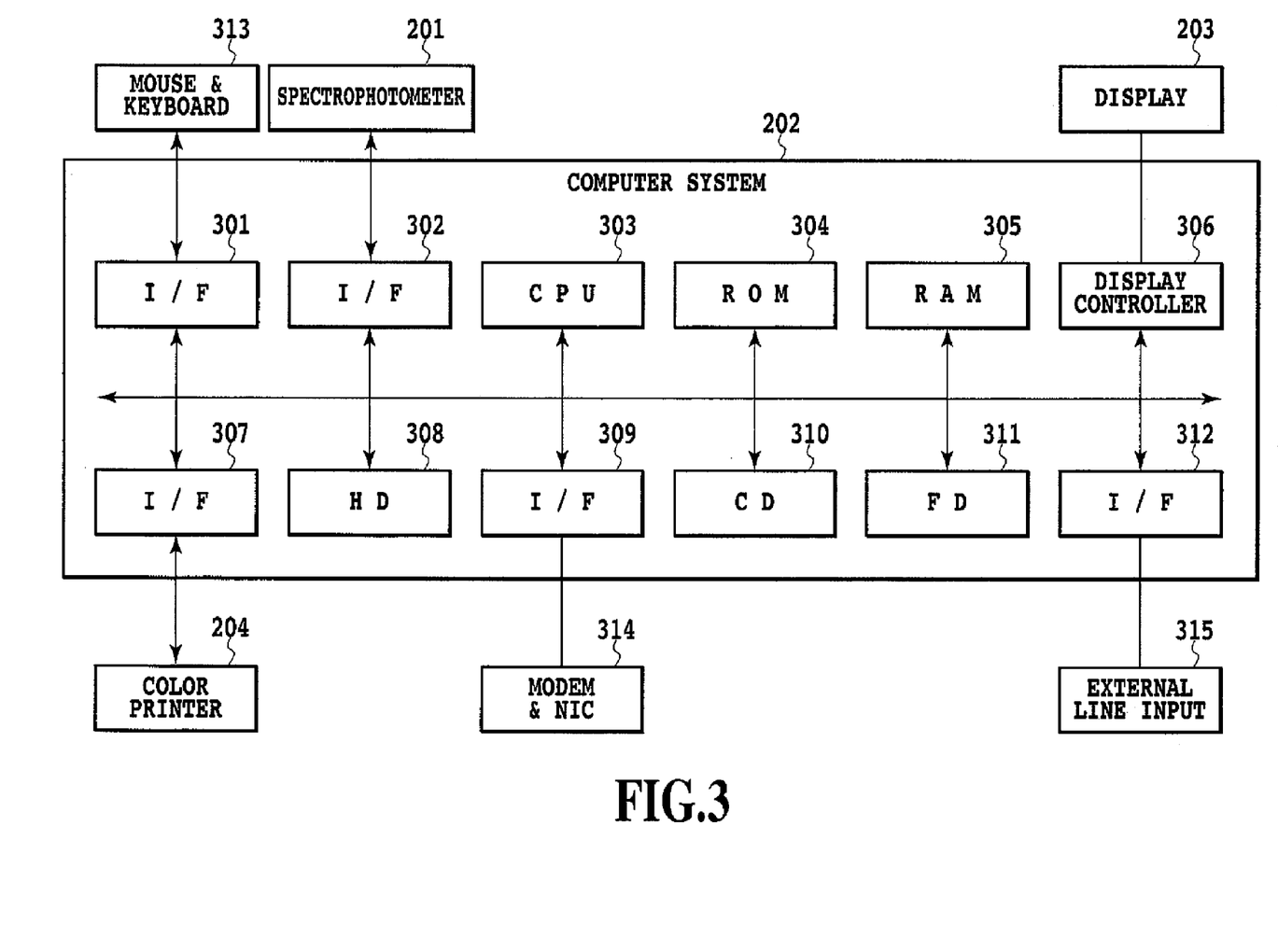
FIG. 3 is a block diagram showing individual modules of the system shown in FIG. 2.

FIG. 3 is a block diagram showing a main section of the configuration of FIG. 2 in blocks of functional modules.

In FIG. 3, the reference numeral 301 designates an interface (I/F) for connecting a mouse and keyboard 313 for a user to input various manual instructions and the like to the computer system 202. The reference numeral 302 designates an interface (I/F) for connecting the computer system 202 with input devices such as the spectrophotometer 201. The reference numeral 303 designates a CPU for controlling the operation of individual internal blocks of the computer system 202, or for executing programs stored inside. The reference numeral 304 designates a ROM for storing the image processing program and the like necessary in advance.

The reference numeral 305 designates a RAM for providing the CPU 303 with a work area for temporarily storing the program for the processing in the CPU 303 and image data to be processed.

The reference numeral 306 designates a display controller for controlling the display unit 203 for displaying an image to be processed or messages to an operator.

The reference numeral 307 designates an interface (I/F) for connecting the computer system 202 with the color printer 204.

The reference numeral 308 designates a hard disk (HD) drive that stores in advance programs and image data to be transferred to the RAM 305, stores the image data after processing, and reads these data.

The reference numeral 314 designates transmission equipment including a modem, network card and the like, which transmits a variety of data held in various sections of the computer system 202 to external devices, and receives a variety of data from the external devices. The reference numeral 309 designates an interface (I/F) for connecting the transmission equipment 314 to the computer system 202.

The reference numeral 310 designates a CD drive which can read data stored in a CD (CD-R/CD-RW/DVD), one of the external storing media, or write data to the CD.

The reference numeral 311 designates an FD drive which can read from or write to an FD in the same manner as the CD drive 310. Incidentally, when the CD, FD or DVD stores an image editing program or printer information, the HD 308 can install the program or information thereon to be transferred to the RAM 305 as needed.

The reference numeral 312 designates a sound interface (I/F) which is connected to an external line input 315 or microphone to input audio data from the outside.

Figure 4:
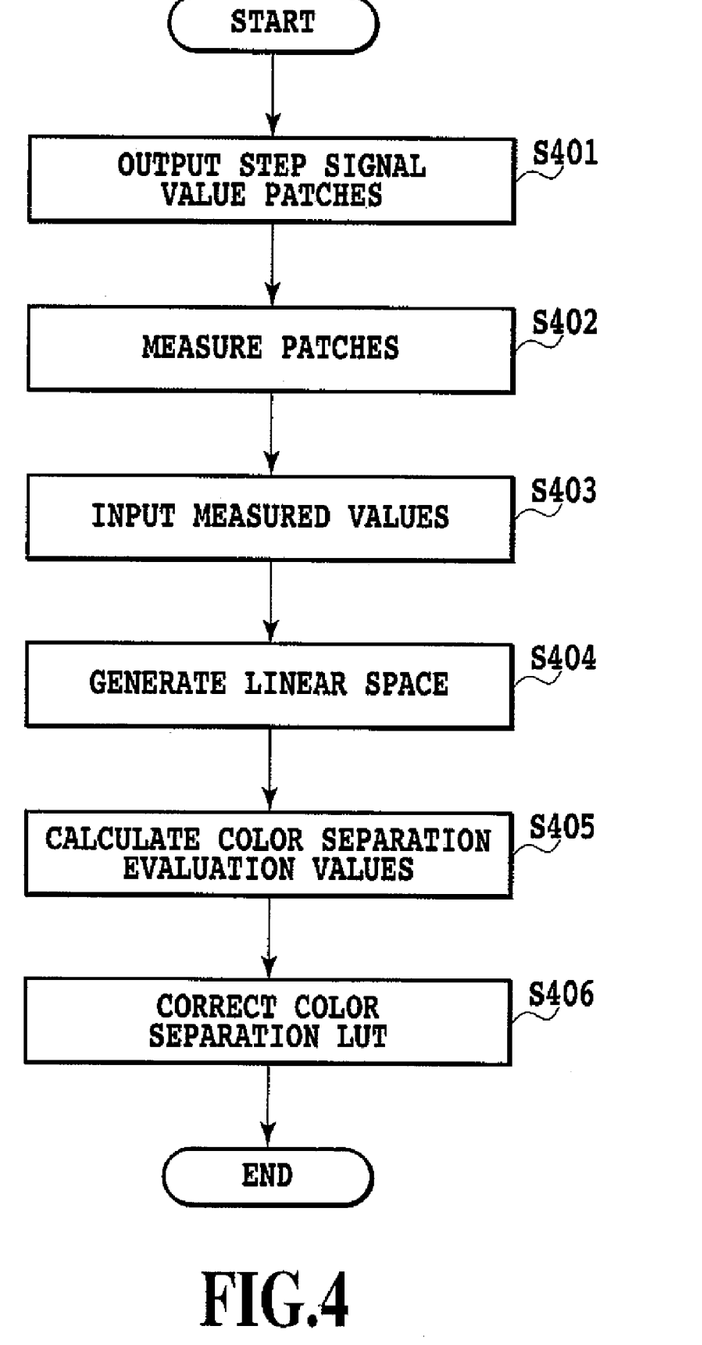
FIG. 4 is a flowchart illustrating the operation of the color separation evaluation and modification of the first embodiment in accordance with the present invention.

FIG. 4 is a flowchart illustrating an operation procedure for carrying out the present embodiment in the configuration as shown in FIG. 2 and FIG. 3. A computer executable program describing the procedure illustrated in the flowchart of FIG. 4 is stored in the ROM 304 in advance. Alternatively, it can be stored in advance in the HD drive 308 as an external storing unit. After reading the program to the RAM 305, the CPU 303 executes the program, thereby carrying out the present embodiment. A printer driver (program) including an LUT, which will be described later, is stored in the HD drive 308 in advance, and is transferred to the RAM 305 when performing each embodiment.

Next, the flow of the color separation evaluation and modification processing in the present embodiment will be described with reference to the flowchart illustrated in FIG. 4.

When the processing starts, data on a desired number of colors are obtained at step S401 by dividing elements (primary colors) of a multidimensional calorimetric system, such as RGB, XYZ and CMYK which are the components of the first color space, into a desired number of steps. The individual color data thus obtained are converted into the second color space data through the LUT. A patch image corresponding to the data (patch data) thus obtained by the conversion is output onto a recording medium by the printer 204. The term "dividing into a desired number of steps" section, in an 8-bit RGB space, for example, to obtain 512 color data, combinations obtained by dividing the individual R, G and B signal values into eight equal parts. The step division is not necessarily uniform. It is possible to make the steps smaller at highlight portions, or to set the number of steps at three or greater and less than 255 in the 8-bit processing system. Although the example handling the three-dimensional RGB signals is described for the convenience of explanation, it is obvious that three-dimensional XYZ values or CIEL*a*b* values or four-dimensional values such as CMYK are also possible. In addition, as for the patch output, although the example of outputting via the personal computer 202 is described, it is also possible to output by directly connecting a signal generator for outputting the patch data (not shown) to the printer 204. Furthermore, it is also possible to use the patch data stored in the external storing unit 308, CD drive 310 or FD drive 311. Moreover, the patch data can be acquired through the transmission equipment 314 such as the modem or network card capable of receiving a variety of data from the external devices. The steps decided and signal values (patch data) used at the patch output are stored in the RAM 305, or in the external storing unit 308 if their volume is large.

For purposes of illustration, the description will be continued as described above under the assumption that the first color space is a three-dimensional RGB space and the second color space is a CMYK space which is the primary colors of the printer. However, the second color space is variable in accordance with the number of color materials mounted on the printer 204. Besides the CMYK space, the second color space can be at least two-dimensional space, and can be a CMYKLcLm and CMRKRGB space.

Next, at step S402, the colorimetry of the patch that is output onto the recording medium at step S401 is carried out using the spectrophotometer 201. The evaluation color space used for the colorimetry can be a CIEL*a*b* space or XYZ space or Jab space, which is the third color space that does not depend on the first or second color space. As for the evaluation color space, although the evaluation in other multidimensional spaces is possible, the three-dimensional space is best in the present invention. It is obvious, however, that the present invention is not limited to the evaluation in the three-dimensional space.

In the present embodiment, for purposes of illustration, the description will be continued below under the assumption that the evaluation color space is an L*a*b* space.

Moving forward to step S403, the calorimetric values of the individual patches passing through the colorimetry at step S402, that is, the CIEL*a*b* values are input. They are stored in the RAM 305 in connection with the signal values of the individual patches stored at step S401, or stored in the HD drive 308 if their volume is large, and proceeds to step S404.

Figure 8:
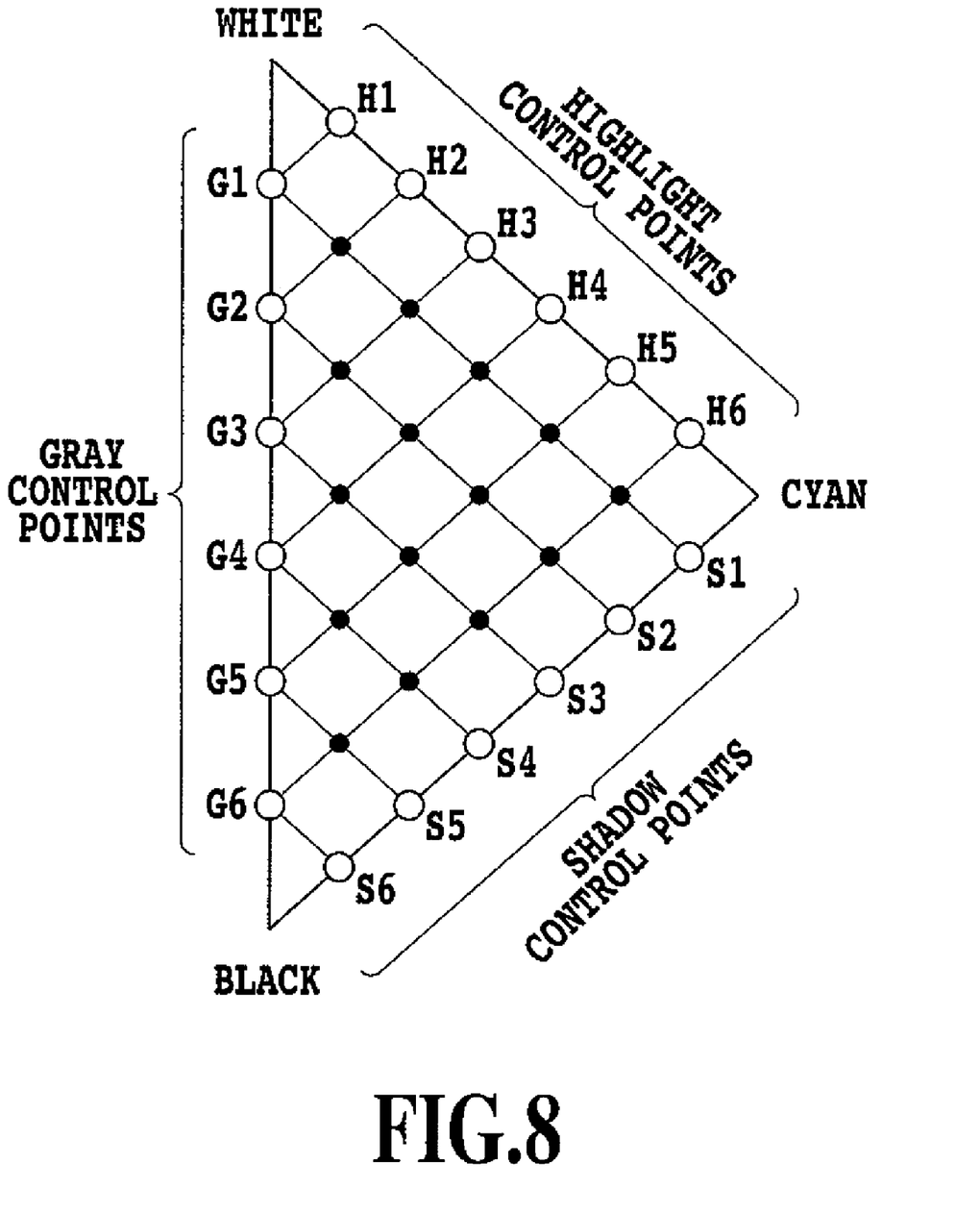
FIG. 8 is a diagram illustrating a target point calculating method in the embodiment in accordance with the present invention.
Figure 10:
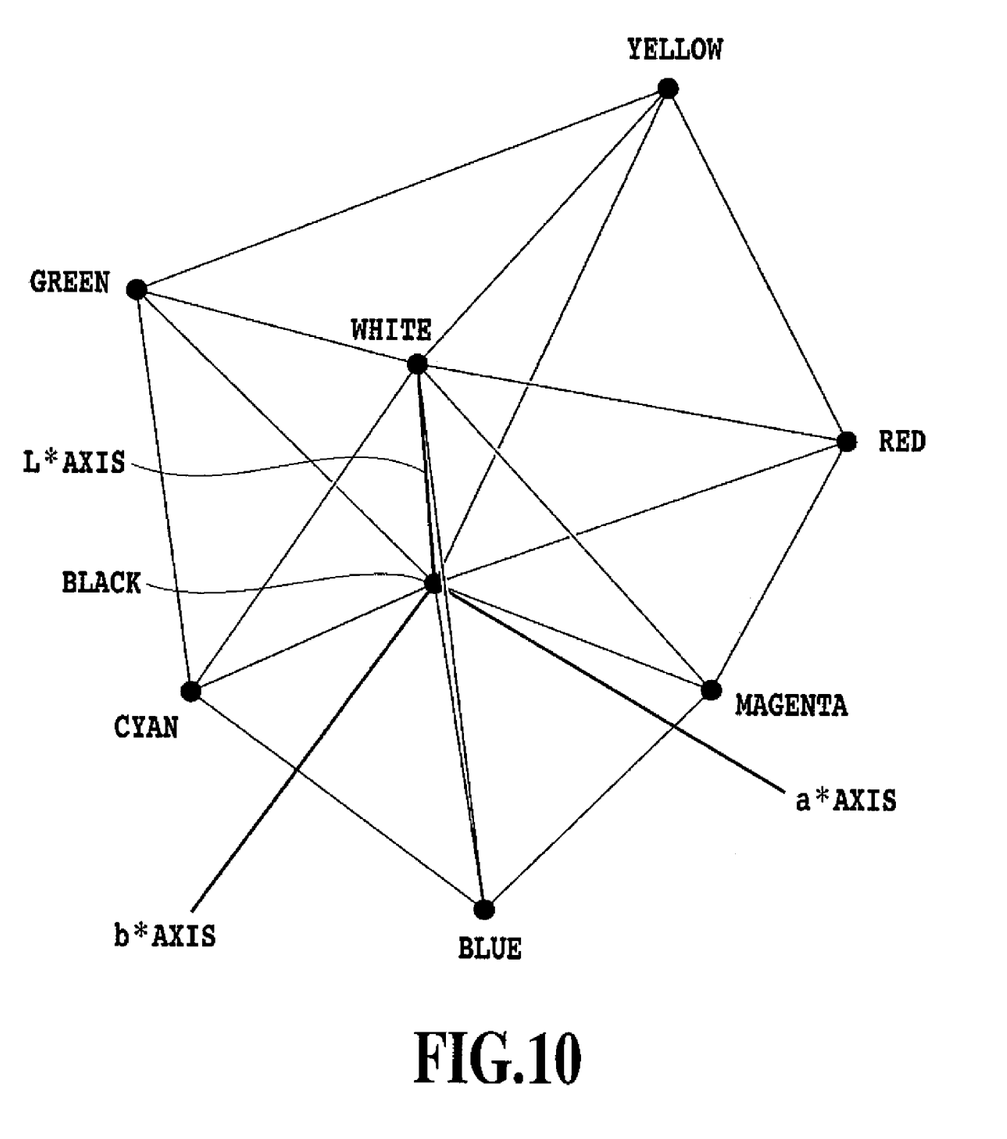
FIG. 10 is a diagram illustrating a linear space in the embodiment in accordance with the present invention.

At step S404, six primaries are extracted which consist of white dots (W), black dots (Bk), and primary colors and secondary colors of the printer from among the relationships between the patch signal values and colorimetric values stored at step S403. The six primaries are cyan (C), magenta (M), yellow (Y), red (R), green (G) and blue (B). Then a solid having the individual dots (W, Bk, C, M, Y, R, G, B) as vertices is formed as shown in FIG. 10. As shown in FIG. 10, planes are formed by individual lines joining the six primaries, W and Bk. On the individual planes formed, meshes are formed as will be described later in detail. Intersection points on the individual meshes are formed in accordance with the number of steps and their intervals determined at step S401. The intersection points on the individual meshes constitute target points. For example, assume that W-Bk, W-C-Bk, W-M-Bk, W-Y-Bk, W-R-Bk, W-G-Bk and W-B-Bk are control lines. Then, the target points are formed as follows: As for each control line, the gradations between the vertices of which are all at least appropriate one of L* (lightness), C* (chroma) and H* (hue), individual control points are formed at linear intervals. For example, target points for W-C-Bk lines are as illustrated in FIG. 8 are formed as follows: Gray control points G1-G6 are formed in such a manner as to become L* linear between W-Bk; highlight control points H1-H6 are formed in such a manner that L* and C* each become linear between W-C; and shadow control points S1-S6 are formed in the same manner between C-Bk. After that, as illustrated in FIG. 8, the gray control points, highlight control points and shadow control points are connected by lines to form internal target points.

Figure 9:
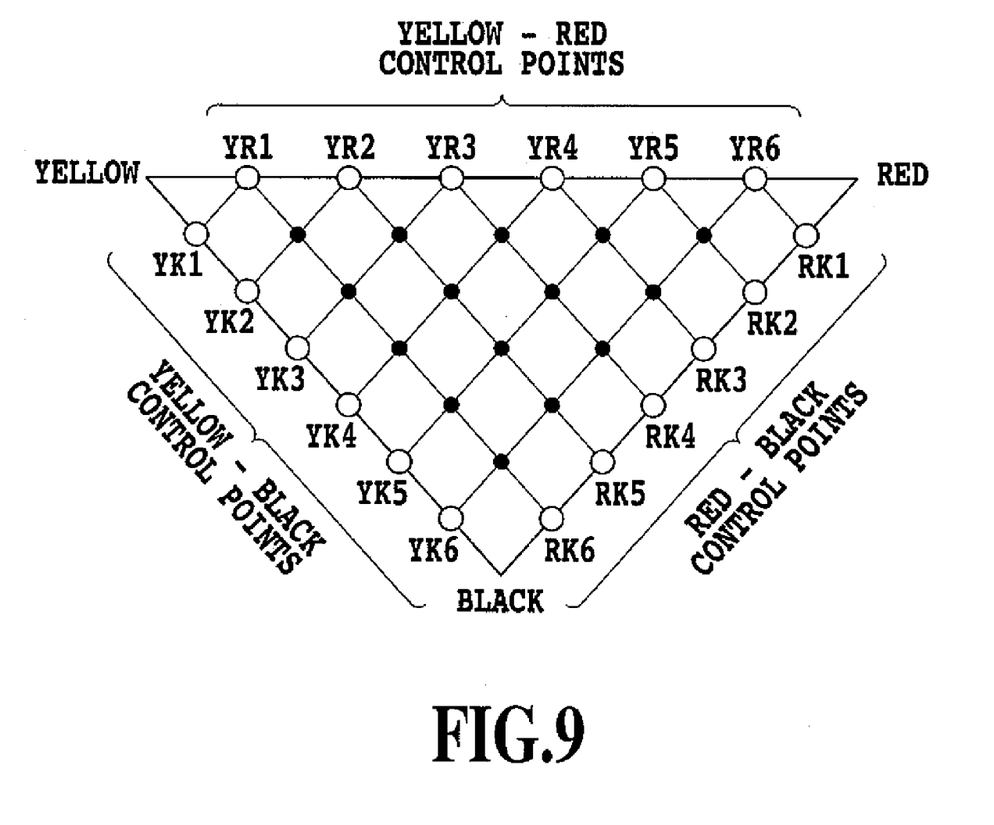
FIG. 9 is a diagram illustrating another target point calculating method in the embodiment in accordance with the present invention.

To form target points for Y-R-Bk lines as illustrated in FIG. 9, for example, the following steps are taken: Yellow-Red control points YR1-YR6 are formed in such a manner as to become H* linear between Y-R; Yellow-Black control points YK1-YK6 are formed in such a manner that L* and H* each become linear between Y-Bk; and Red-Black control points RK1-RK6 are formed in the same manner between R-Bk. After that, as illustrated in FIG. 9, the Yellow-Red control points, Yellow-Black control points and Red-Black control points are connected by lines to form internal target points.

Thus, the data (target points) on the L*a*b* space are formed as ideal values applicable as an evaluation reference to the individual patch data.

The coordinate (target point) data of the individual points formed in the linear space are stored in the RAM 305, or in the HD drive 308 or the like if their volume is large.

Next, at step S405, evaluation values of the color separation are calculated. In the evaluation color space of the present embodiment, using the data stored in the RAM 305, the color separation evaluation values are obtained from the differences between the ideal values (target points) at the individual points in the linear space formed at step S404 and the actual measurement values input at step S403. As the differences, it is possible to employ a method using ΔEab, or a method such as ΔE94 having the chroma direction as a denominator, or geometrical calculation. The calculated evaluation values can be output through the display 203, for example. Alternatively, they can be printed out, or stored in a storing medium such as a CD in the form of electronic data.

To carry out the color separation processing modification, the processing proceeds to the subsequent step S406.

At step S406, the data for the conversion in the LUT are corrected in such a manner as to reduce the calculated differences to zero at step S406. At the correction, three-dimensional interpolation such as cubic interpolation and tetrahedral interpolation is carried out according to the surrounding space points. Then, the data after the correction are spatially calculated from the color material ground associated with the control points used as the individual interpolations.

In addition, it goes without saying that the interpolation method employed in the spatial interpolation of the foregoing correction is not limited to the cubic interpolation or tetrahedral interpolation. A series of procedures is completed when step S406 is terminated.

Second Embodiment

Although all the target points of the evaluation color space in the first embodiment are formed linearly with respect to L*, C* and H*, the present invention is not limited to this. For example, gamma values can be considered which are used to achieve rich expression of the gradation in a printer with a large dynamic range. Such a configuration is shown in FIG. 5.

Figure 5:
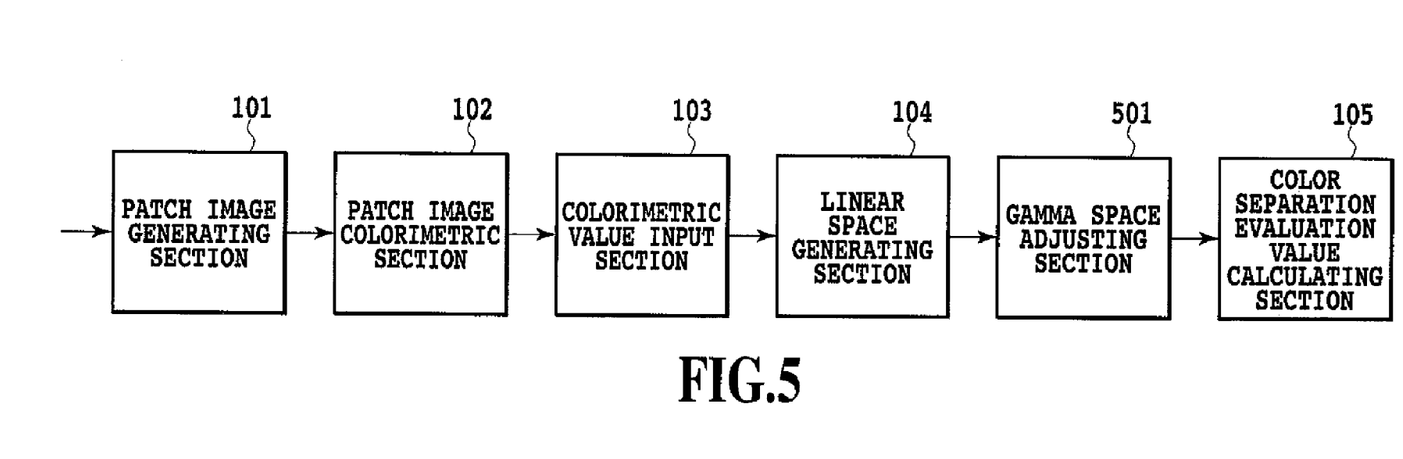
FIG. 5 is a block diagram showing an entire configuration of a color separation evaluation system of a color printer of a second embodiment in accordance with the present invention.

As shown in FIG. 5, a gamma space adjusting section 501 is interposed between the linear space generating section 104 and the color separation evaluation value calculating section 105. In accordance with the gamma value a user designates freely such as 1.8 and 2.2, the gamma space adjusting section 501 can adjust (determine) the coordinates of the target points in the L*a*b* space, which are fed from the linear space generating section 104, with providing gamma in the lightness direction.

Third Embodiment

Although in the first and second embodiments the solid is formed which has the vertices of the six primaries consisting of the white dot (W), black dot (Bk) and primary colors and secondary colors of the printer to form the target points in the evaluation color space, the present invention is not limited to this. The six primaries are cyan (C), magenta (M), yellow (Y), red (R), green (G) and blue (B), which are the primary colors and secondary colors of the printer. The calorimetric values of the color separation of the following seven lines often do not exhibit linear transition in the L*a*b* space because of the characteristics of the color materials. Thus, such a configuration is also possible which considers the hue transition in forming the evaluation color space. One of the seven lines is the W-Bk line joining the white dot (W) and black dot (Bk) constituting the primary colors and secondary colors of the printer. The remainder is W-C-Bk, W-M-Bk, W-Y-Bk, W-R-Bk, W-G-Bk and W-B-Bk, which have as the vertices the six primaries constituting the primary colors and secondary colors of the printer color space.

Figure 7:
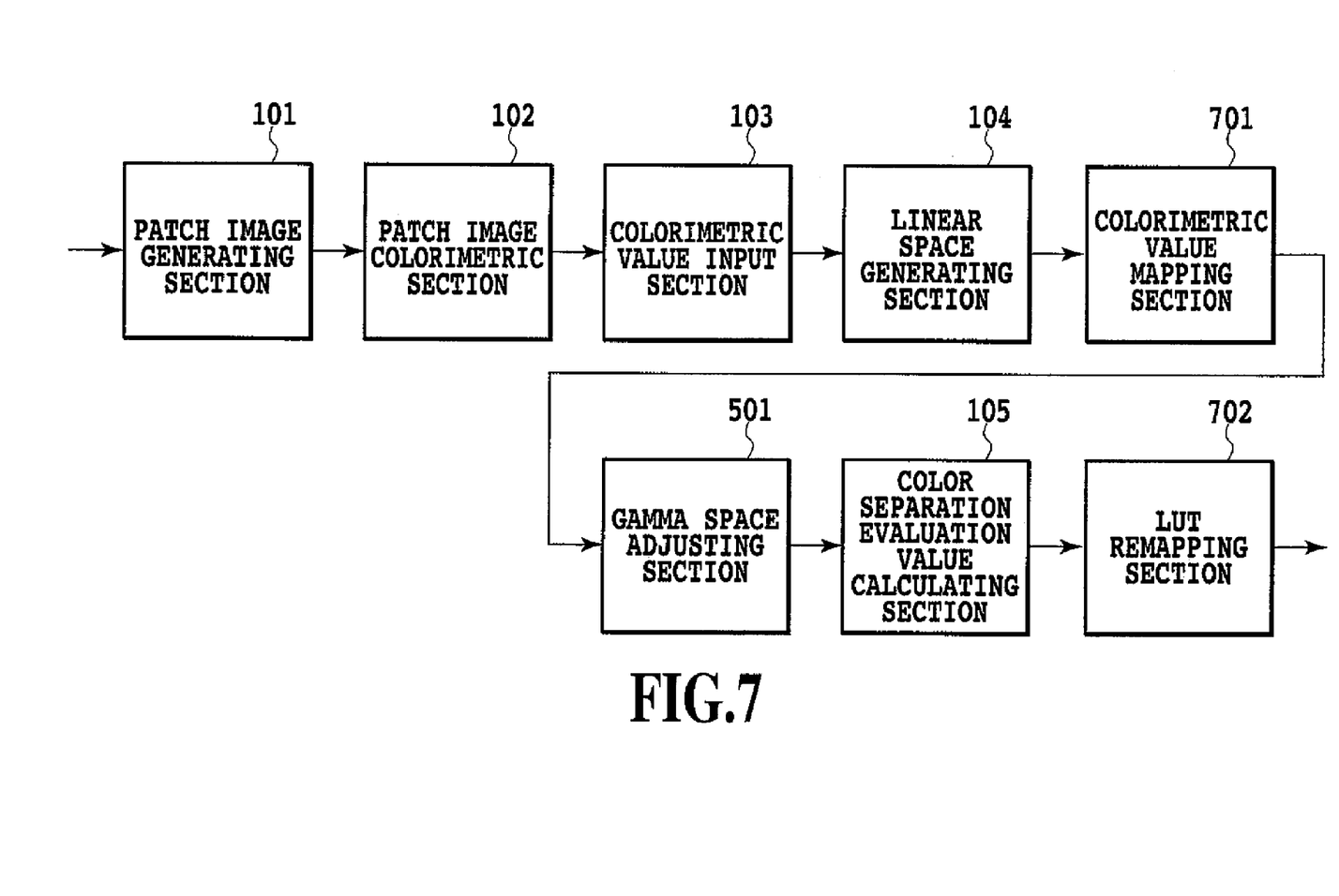
FIG. 7 is a block diagram showing an entire configuration of a color separation evaluation system of a color printer of the third embodiment in accordance with the present invention.

Such a configuration is shown in FIG. 7. As shown in FIG. 7, it differs from the configuration of FIG. 5 in that a calorimetric value mapping section 701 is interposed between the linear space generating section 104 and the gamma space adjusting section 501. The calorimetric value mapping section 701 carries out mapping onto a linear space the spatial curves of the colorimetric values when measuring the color materials separately. In addition, an LUT remapping section 702 is newly added at the final stage of the processing. The LUT remapping section 702 carries out remapping onto the real space in the entirely inverse method to the method that carries out the mapping onto the linear space in the calorimetric value mapping section 701.

Figure 6:
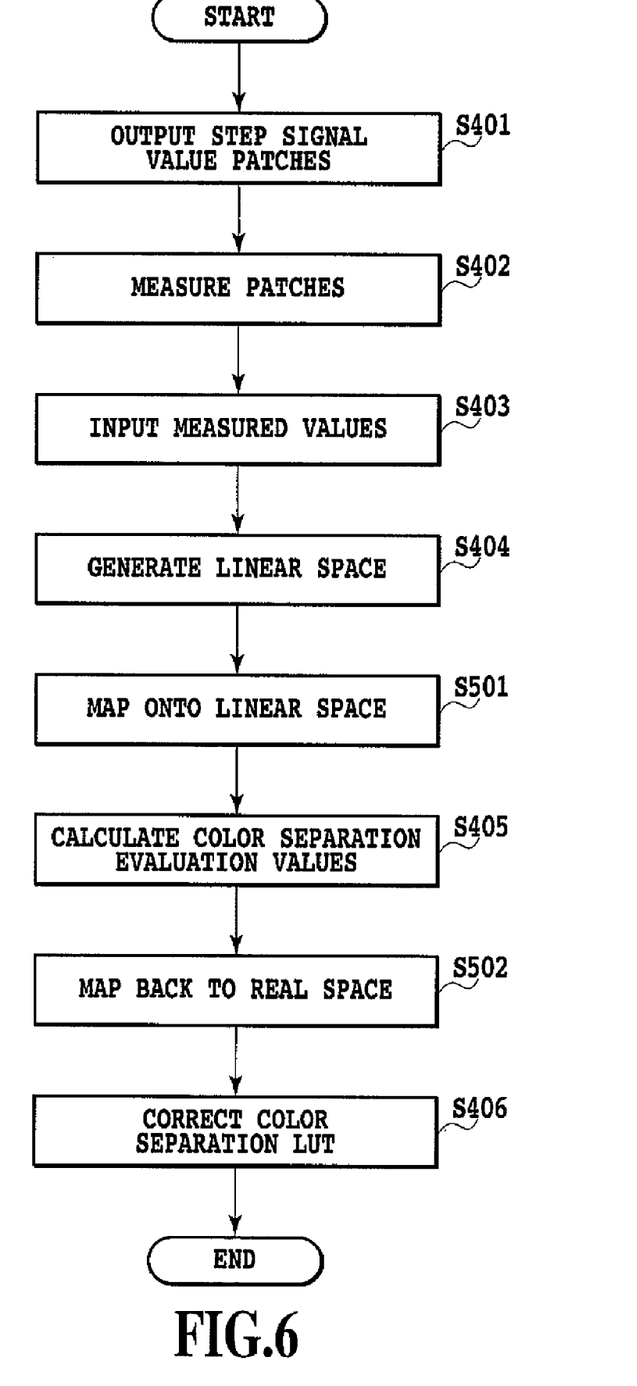
FIG. 6 is a flowchart illustrating the operation of the color separation evaluation and modification of a third embodiment in accordance with the present invention.

A flow in the processing will be described with reference to the flowchart illustrated in FIG. 6. Since the operation is the same as that of the embodiment 1 from step S401 to step S406, its detailed description will be omitted here.

At step S501, the mapping is carried out which enables the colorimetric values of each of the printer-loaded color materials and of the W-C, W-M, W-Y, W-R, W-G and W-B composed of the secondary colors to exist in the linear space as illustrated in FIG. 10. In this mapping, geometrical conversion such as affine conversion can be used, besides any other conversions.

At step S502, the completely inverse method to that of step S501 is carried out to restore geometrically to the actual measurement space.

In FIG. 1, it is possible to interpose the calorimetric value mapping section 701 between the linear space generating section 104 and the color separation evaluation calculating section 105, and to add the LUT remapping section 702 to the final stage of the processing.

Variations

The present invention is not limited to the apparatus and method for implementing the foregoing embodiments. For example, such a configuration is also possible that supplies the computer (CPU or MPU) in the foregoing system or apparatus with program code of software for implementing the foregoing embodiments, and the computer of the foregoing system or apparatus operates the foregoing devices in accordance with the program code. Such a configuration for implementing the foregoing embodiments also falls within the scope of the present invention.

In this case, the program code itself of the software implements the functions of the foregoing embodiments. The program code itself, and a section for supplying the program code to the computer, that is, a storing medium that stores the program code also fall within the scope of the present invention.

As the storing medium for storing the program code, it is possible to use a floppy (registered trademark) disk, hard disk, optical disk, magneto-optical disk, CD-ROM, magnetic tape, nonvolatile memory card or ROM.

The present invention is not limited to the case where the computer satisfies the functions of the foregoing embodiments by controlling the individual devices in accordance with the program code supplied. Specifically, the program code also falls within the scope of the present invention in the case where the program code implements the foregoing embodiments in conjunction with the OS (operating system) or other application software working on the computer.

The program code supplied can be stored in a memory provided in an expanded board of the computer or in an expanded unit connected to the computer. After that, according to the instructions of the program code, the CPU provided in the expanded board or expanded unit executes a whole or part of the actual processing. Such a case where the processing implements the foregoing embodiments also falls within the scope of the present invention.

Finally, such a configuration that includes at least one of the variety of characteristics described above also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-001517, filed Jan. 6, 2006, which is hereby incorporated by reference herein in its entirety.

What is claimed is:

1. A color processing method for evaluating a color converting process for converting color data of a first color space to color data of a second color space, the color processing method comprising:
    an input step of inputting a plurality of measured data in a third color space, each measured data obtained by carrying out colorimetry of patch images output onto a recording medium using a plurality of patch data comprising the color data of the second color space, which color data corresponds to each of color data of individual steps obtained by resolving the first color space into a plurality of steps;
    an extracting step of extracting a set of measured data, corresponding to a plurality of reference points which are vertices in the first color space, from the plurality of measured data;
    a generating step of generating, by using the extracted set of measured data, a plurality of target data linearly distributed in the third color space, the plurality of target data corresponding to the each of color data of individual steps; and
    a calculating step of calculating evaluation values from differences between the input plurality of measured data and the generated plurality of target data,
    wherein the plurality of patch data is obtained from the color data of the second color space converted from the color data of the individual steps by the color converting process.

2. A computer readable storage medium storing a computer-executable program for causing a computer to execute the color processing method according to claim 1.

3. A color processing apparatus for evaluating a color converting process for converting color data of a first color space to color data of a second color space, the color processing apparatus comprising:
    an input section for inputting a plurality of measured data in a third color space, each measured data obtained by carrying out colorimetry of patch images output onto a recording medium using a plurality of patch data comprising the color data of the second color space, which color data corresponds to each of color data of individual steps obtained by resolving the first color space into a plurality of steps;
    an extracting section for extracting a set of measured data, corresponding to a plurality of reference points which are vertices in the first color space, from the plurality of measured data;
    a generating section for generating, by using the extracted set of measured data, a plurality of target data linearly distributed in the third color space, the plurality of target data corresponding to the each of color data of individual steps; and
    a calculating section for calculating evaluation values from differences between the input plurality of measured data and the generated plurality of target data,
    wherein the plurality of patch data is obtained from the color data of the second color space converted from the color data of the individual steps by the color converting process.

4. The color processing apparatus as claimed in claim 3, wherein the reference points are white, black and primaries of primary colors and secondary colors, and wherein the plurality of target are generated such that the gradation between the primaries become linear with respect to one of lightness, chroma and hue.

5. The color processing apparatus as claimed in claim 3, further comprising an output section and a gamma space adjusting section, wherein
    the output section outputs a color image with using the color data converted by the color converted process, and
    the gamma space adjusting section adjusts, in accordance with a gamma value of lightness provided by the color converting process, coordinate data of spatial distribution points corresponding to an evaluation reference in the third color space, and supplies the adjusted coordinate data to the calculating section.

6. The color processing apparatus as claimed in claim 5, further comprising a colorimetric value mapping section and a colorimetric value remapping section, wherein
    the colorimetric value mapping section carries out mapping of the generated target data such that the generated target data exhibits spatial curves of colorimetric values of primary colors, and supplies the generated target data to the gamma space adjusting section, and
    the colorimetric value remapping section carries out remapping of the evaluation values calculated by the calculating section in a direction opposite to the mapping carried out in the colorimetric value mapping section.

7. The color processing apparatus as claimed in claim 3, further comprising a colorimetric value mapping section and a colorimetric value remapping section, wherein the colorimetric value mapping section carries out mapping of the generated target data such that the generated target data exhibits spatial curves of colorimetric values of primary colors, and supplies the generated target data to the calculating section, and the colorimetric value remapping section carries out remapping of the evaluation values calculated by the calculating section in a direction opposite to the mapping carried out in the colorimetric value mapping section.

8. The color processing apparatus as claimed in claim 3, further comprising a correcting section for correcting values converted by the color converting process in accordance with the differences calculated by the calculating section.

9. The color processing apparatus as claimed in claim 3, wherein the first color space is one of an RGB space, an L*a*b* space, an XYZ space and a CMYK space.

10. The color processing apparatus as claimed in claim 5, wherein the second color space corresponds to color materials mounted on the output section.

11. The color processing apparatus as claimed in claim 3, wherein the third color space is one of an L*a*b* space, an XYZ space and a Jab space.

\* \* \* \* \*